United States Patent
Ferreras (10) Patent No.: US 10,403,162 B2
(45) Date of Patent: **\*Sep. 3, 2019**

(54) GAME SYSTEM AND METHOD FOR LEARNING MATHEMATICS

(71) Applicant: Julian Ferreras, Barrow, AK (US)

(72) Inventor: Julian Ferreras, Barrow, AK (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/457,645

(22) Filed: Mar. 13, 2017

(65) Prior Publication Data

US 2018/0068571 A1 Mar. 8, 2018

Related U.S. Application Data

(63) Continuation-in-part of application No. 15/347,671, filed on Nov. 9, 2016, now Pat. No. 10,217,373.

(60) Provisional application No. 62/383,065, filed on Sep. 2, 2016.

(51) Int. Cl.
| | |
|---|---|
| *A63F 1/00* | (2006.01) |
| *G09B 1/34* | (2006.01) |
| *A63F 3/04* | (2006.01) |
| *A63F 9/20* | (2006.01) |

(52) U.S. Cl.
CPC .............. *G09B 1/34* (2013.01); *A63F 3/0415* (2013.01); *A63F 9/20* (2013.01)

(58) Field of Classification Search
CPC ........................................................ A63F 1/00
USPC ......................................................... 273/292
See application file for complete search history.

(56) References Cited

U.S. PATENT DOCUMENTS

| | | | |
|---|---|---|---|
| 143,703 A | 10/1873 | Louineau | |
| 243,855 A | 7/1881 | Crandall | |
| 253,895 A | 2/1882 | Sheldon | |
| 278,646 A | 5/1883 | Williams | |
| 303,816 A * | 8/1884 | Crosby | ..................... A63F 1/02 |
| | | | 273/293 |
| 533,216 A | 1/1895 | Troelltsch | |
| 599,767 A | 3/1898 | Clarke | |
| 741,984 A | 10/1903 | Tavenner | |
| 793,455 A | 6/1905 | Mandelbaum | |
| 956,827 A | 5/1910 | Rieth | |
| 1,057,206 A | 3/1913 | Zuydhoek | |
| 2,198,670 A * | 4/1940 | Corydon | ................ G09B 19/02 |
| | | | 273/299 |
| 2,253,823 A * | 8/1941 | Suteras | ..................... A63F 9/20 |
| | | | 273/289 |
| D142,491 S * | 10/1945 | Neiser | ........................... 273/292 |

(Continued)

*Primary Examiner* — John E Simms, Jr.
*Assistant Examiner* — Dolores R Collins
(74) *Attorney, Agent, or Firm* — Seed Intellectual Property Law Group LLP (57) ABSTRACT

A method of playing a learning game having game pieces with a playing face divided into first and second sections, the first section displaying a first number and the second section displaying the first number, a mathematical operation, and a second number, the method including taking turns to place a game piece on a playing surface adjacent a game piece already on the playing surface in which a numeric value of the first number in the first section of the game piece or the numeric value of the result of the mathematical operation in the second section is equal to a numeric value of a first or second section of the game piece already on the playing surface that is not adjacent another game piece.

4 Claims, 8 Drawing Sheets

(56) References Cited

U.S. PATENT DOCUMENTS

| | | | | |
|---|---|---|---|---|
| 3,680,866 | A | * | 8/1972 | Kerr .......................... A63F 9/20 273/293 |
| 3,773,327 | A | | 11/1973 | Kremer |
| 4,125,263 | A | * | 11/1978 | Hamilton ................... A63F 9/20 273/293 |
| 4,359,227 | A | * | 11/1982 | Porciello ................... A63F 3/00 273/268 |
| 5,108,291 | A | | 4/1992 | Kuo |
| D338,243 | S | * | 8/1993 | Underwood ................. D21/391 |
| 6,062,566 | A | * | 5/2000 | Lemons .................... A63F 9/20 273/292 |
| 6,209,875 | B1 | * | 4/2001 | Vildosola ................... A63F 9/20 273/302 |
| 6,971,649 | B2 | * | 12/2005 | Richardson ............... A63F 9/20 273/293 |
| 7,380,792 | B2 | * | 6/2008 | Taranino ................... A63F 9/20 273/146 |
| 7,857,315 | B2 | * | 12/2010 | Hoyt ..................... A63F 3/0415 273/293 |
| D662,149 | S | | 6/2012 | Nathanson |
| 8,596,642 | B2 | * | 12/2013 | Watkins .............. A63F 3/00157 273/274 |
| 2010/0148443 | A1 | * | 6/2010 | Hoyt ..................... A63F 3/0415 273/293 |
| 2012/0244922 | A1 | * | 9/2012 | Horovitz ............. A63F 3/0423 463/11 |

* cited by examiner

| 1x1 | 1x1 | 1x1 | 1x1 | 1x1 | 1x1 | 1x1 | 1x1 | 1x1 | 1x1 |
|-----|-----|-----|-----|-----|-----|-----|-----|-----|-----|
| 1x1 | 1x2 | 1x3 | 2x2 | 1x5 | 2x3 | 1x7 | 2x4 | 1x9 | 2x5 |

| 1x2 | 1x2 | 1x2 | 1x2 | 1x2 | 1x2 | 1x2 | 1x2 | 1x2 |
|-----|-----|-----|-----|-----|-----|-----|-----|-----|
| 1x2 | 1x3 | 2x2 | 1x5 | 2x3 | 1x7 | 2x4 | 1x9 | 2x5 |

| 1x3 | 1x3 | 1x3 | 1x3 | 1x3 | 1x3 | 1x3 | 1x3 |
|-----|-----|-----|-----|-----|-----|-----|-----|
| 1x3 | 2x2 | 1x5 | 2x3 | 1x7 | 2x4 | 1x9 | 2x5 |

| 2x2 | 2x2 | 2x2 | 2x2 | 2x2 | 2x2 | 2x2 |
|-----|-----|-----|-----|-----|-----|-----|
| 1x4 | 1x5 | 2x3 | 1x7 | 2x4 | 1x9 | 2x5 |

| 1x5 | 1x5 | 1x5 | 1x5 | 1x5 | 1x5 |
|-----|-----|-----|-----|-----|-----|
| 1x5 | 2x3 | 1x7 | 2x4 | 1x9 | 2x5 |

| 2x3 | 2x3 | 2x3 | 2x3 | 2x3 |
|-----|-----|-----|-----|-----|
| 1x6 | 1x7 | 2x4 | 1x9 | 2x5 |

| 1x7 | 1x7 | 1x7 | 1x7 |
|-----|-----|-----|-----|
| 1x7 | 2x4 | 1x9 | 2x5 |

| 2x4 | 2x4 | 2x4 |
|-----|-----|-----|
| 1x8 | 1x9 | 2x5 |

| 1x9 | 1x9 |
|-----|-----|
| 1x9 | 2x5 |

| 2x5 |
|-----|
| 1x10 |

| 2-1 | 3-2 | 4-3 | 5-4 | 6-5 | 7-6 | 8-7 |
|---|---|---|---|---|---|---|
| 12-11 | 12-10 | 12-9 | 12-8 | 12-7 | 12-6 | 12-5 |

| 3-1 | 4-2 | 5-3 | 6-4 | 7-5 | 8-6 |
|---|---|---|---|---|---|
| 13-11 | 13-10 | 13-9 | 13-8 | 13-7 | 13-6 |

| 4-1 | 5-2 | 6-3 | 7-4 | 8-5 |
|---|---|---|---|---|
| 14-11 | 14-10 | 14-9 | 14-8 | 14-7 |

| 5-1 | 6-2 | 7-3 | 8-4 |
|---|---|---|---|
| 15-11 | 15-10 | 15-9 | 15-8 |

| 6-1 | 7-2 | 8-3 |
|---|---|---|
| 16-11 | 16-10 | 16-9 |

| 7-1 | 8-2 |
|---|---|
| 17-11 | 17-10 |

| 8-1 |
|---|
| 18-11 |

GAME SYSTEM AND METHOD FOR LEARNING MATHEMATICS

BACKGROUND

Technical Field

The present disclosure pertains to educational game systems and, more particularly, to a dominoes style game and method of play for learning basic math operations.

Description of the Related Art

The game of dominoes has been played in many variations throughout the centuries. It is believed that dominoes originated from dice and were developed by the Chinese at some time in the 12th century. The game has evolved over the years to now include 28 rectangular blocks having a playing face divided into two equal-sized squares. Dots or "pips" representing numbers are formed in each square. A single dot represents the number one and two dots represent the number two. Up to six dots can appear in a single square. Some squares can be left blank. A domino block having two blank squares or having the same number in both squares is known as a double.

According to one set of rules, at the commencement of the game, the dominoes are mixed with their faces downwards. Each person draws seven pieces at random. Various mechanisms can be employed to determine which player places the first piece on the playing surface. The next player must match the number at either end of the piece he may choose, according to the number of dots or the blank in the chosen square of the domino. The second block is thus placed with the matching number up against the first played number. Whenever any player cannot match a played domino, either the domino last put down, or of that unpaired domino at the other end of the row, then she must draw a block from the mixed blocks and the next person plays. Thus they play alternately, either until one player has played all his or her pieces, and thereby won the game, or until the game is blocked; that is, when neither party can play by matching the pieces when unpaired at either end. The winner is the player who possesses the lowest number of dots on the pieces remaining. In playing this game it is to the advantage of the player to dispossess, as early as possible, the higher number pieces, such as a double-six, five, four, etc. Sometimes when two persons play, they take each only seven pieces, and agree to play or draw, that is when one cannot come in or pair the pieces on the board at the end unmatched, he then is to draw from the fourteen pieces in stock until he finds one to suit.

Over the years, various inventors have patented alterations to the domino blocks or to the method of play or both. For example, in 1873 a patent issued to Louineau (U.S. Pat. No. 143,703) described a modification to the traditional dominoes game wherein different number sets of points or dots are of different colors. In 1881 Crandall obtained U.S. Pat. No. 243,855 for dominoes with partial animal shapes thereon. And in 1882, Sheldon (U.S. Pat. No. 253,895) designed a combination playing card and dominoes. The following year Williams (U.S. Pat. No. 278,646) used dominoes that employ different colors for different number sets of dots. Twelve years later, Troelltsch's U.S. Pat. No. 533,216, issued in 1898, for a picture game for illustrating first reckoning. The pictures include black dots, colored circles, hearts, and a phase of the moon, among others. Mathematical operations are also disclosed. And just before the turn of the century, Clarke obtained U.S. Pat. No. 599,767 that described game pieces that can be used in games analogous to dominoes.

In the 20th century, a number of additional patents followed:

Tavenner (U.S. Pat. No. 741,984) illustrates a picture game that includes dots and other symbols that are suitable for instructing children in the rudiments of arithmetic. Mandelbaum (U.S. Pat. No. 793,455) provides domino game pieces that include sets of dots and suits of cards. Rieth (U.S. Pat. No. 956,827) proposed a combination of game blocks that can be used to play games of cards and dominoes. Each block shows a card suit and a card value. Zuydhoek (U.S. Pat. No. 1,057,206) uses dominoes or playing cards in which numbers and colors can be used.

Kremer (U.S. Pat. No. 3,773,327) describes an apparatus for playing a game, in which domino-like members are arranged in abutted relationship by matching a visible symbol on one member with a visible symbol on another member, consisting of a set of domino-like members each having two parts, each part bearing a visible symbol and mating elements individual to the symbol borne by the part whereby during the game the correctness of matching is checked by whether the mating elements of the two matched parts will cooperate. One part has mating elements on three sides.

Kuo (U.S. Pat. No. 5,108,291) uses a number of rectangular blocks of a prescribed shape that occupy a predetermined area when assembled together, and a corresponding area of triangular shaped blocks of various sizes and shapes. In addition to creating artistic designs by different arrangements of the blocks, which may be of different colors, the rectangular blocks can be used in the fashion of a domino game, and the dimensional relationship between the triangular blocks and the rectangular blocks teaches the basic concepts of mathematics, including addition, subtraction, multiplication, fractions, areas, and the like.

Lemons (U.S. Pat. No. 6,062,566) provides a dominoes-style mathematical operation game.

Vildosola (U.S. Pat. No. 6,209,875) describes a domino playing piece system for helping children learn and recognize numbers and animals. The device includes a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

Neiser (Design 142,491) offers a design for a set of dominoes while Underwood (Design 338,243) illustrates a design for a set of educational block tiles. Domino tiles show different geometrical shapes in the place of dots. And Nathanson (Design 662,149) provides a design for a set of domino tiles that include graphic displays of fruits.

BRIEF SUMMARY

In accordance with the present disclosure, a method of playing a learning game is provided that includes game pieces with a playing face divided into first and second sections, the first section displaying a first number and the second section displaying a first number, a mathematical operation, and a second number, the method including taking turns to place a game piece on a playing surface adjacent a game piece already on the playing surface in which a numeric value of the first number in the first section of the game piece or the numeric value of the result of the mathematical operation in the second section is equal to a numeric value of a first or second section of the game piece already on the playing surface that is not adjacent another game piece.

In accordance with another aspect of the present disclosure, a learning game system is provided that includes a plurality of game pieces, each game piece having first and second opposing sides with a playing face on the first side that is divided into a first section and a second section, the first section displaying a first number and the second section displaying the first number, a mathematical operation, and a second number, and each game piece that has the first number in the first section equal to the result of the mathematical operation in the second section is denominated as a "double" piece. The learning game system further includes rules of play that include the following steps:

- shuffling the plurality of game pieces on a playing surface with the playing face facing the playing surface to form a draw pile of game pieces;
- each player drawing a same number of game pieces from the draw pile of game pieces to form a hand of game pieces;
- selecting a first player having a highest value double piece in their hand of game pieces to place the highest value double piece on the playing surface; and
- subsequent players taking a respective turn by either (i) placing a game piece from the respective subsequent player's hand of game pieces on to the playing surface adjacent a playing piece already on the playing surface in which a numeric value of the first number in the first section of the playing piece or the numeric value of the mathematical operation in the second section is equal to a numeric value of a first or second section of the playing piece already on the playing surface that is not adjacent another playing piece on the playing surface, or (ii) if no game piece in the subsequent player's hand can be played, the subsequent player drawing game pieces from the pile of game pieces until the subsequent player draws a game piece that can be played on the playing surface in accordance with step (i).

In accordance with another aspect of the present disclosure, a method of playing a learning game is disclosed, the game having a plurality of game pieces, each game piece having first and second opposing sides with a playing face on the first side divided into a first section and a second section, the first section displaying a first number and the second section displaying the first number, a mathematical operation, and a second number, and each game piece that has the first number in the first section equal to the result of the mathematical operation in the second section is denominated as a "double" piece, the method including:

- shuffling the plurality of game pieces on a playing surface with the playing face facing the playing surface to form a draw pile of game pieces;
- each player drawing a same number of pieces from the draw pile of game pieces to form a hand of game pieces;
- determining a first player by determining which player has a highest numeric value double piece in their hand of game pieces;
- playing a first game piece on the playing surface; and
- taking turns by subsequent players by either:
  (i) placing a game piece from the respective subsequent player's hand of pieces on to the playing surface adjacent a game piece already on the playing surface in which a numeric value of the first number in the first section of the game piece or the numeric value of the mathematical operation in the second section is equal to a numeric value of a first or second section of the game piece already on the playing surface that is not adjacent another game piece on the playing surface, or
  (ii) if no game piece in the subsequent player's hand can be played, the subsequent player drawing game pieces from the pile of game pieces until the subsequent player draws a game piece that can be played on the playing surface in accordance with step (i).

In accordance with another aspect of the present disclosure, a game is provided that includes a plurality of game components having at least 28 game pieces, each game piece formed of a game piece having at least a first side, the first side forming a playing face, the playing face divided into two sections, a first section displaying a first number and the second section displaying a mathematical operation that includes the first number and a second whole number. Ideally the outcome of the mathematical operation is equal to or less than a total number of game pieces having a numeric value of "1" in the first section. Preferably the first number is a natural number and the second number is a whole number, and the mathematical operation comprises one from among addition, subtraction, division, and multiplication.

In accordance with another aspect of the present disclosure, the game has 28 game pieces and seven game pieces have the numeric value "1" as the first number, six game pieces have the numeric value "2" as the first number, five game pieces have the numeric value "3" as the first number, four game pieces have the numeric value "4" as the first number, three game pieces have the numeric value "5" as the first number, two game pieces have the numeric value "6" as the first number, and one game piece has the numeric value "7" as the first number.

In accordance with another aspect of the present disclosure, the game has at least 56 game pieces wherein ten game pieces have the numeric value "1" as the first number, nine game pieces have the numeric value "2" as the first number, eight game pieces have the numeric value "3" as the first number, seven game pieces have the numeric value "4" as the first number, six game pieces have the numeric value "5" as the first number, five game pieces have the numeric value "6" as the first number, four game pieces have the numeric value "7" as the first number, three game pieces have the numeric value "8" as the first number, two game pieces have the numeric value "9" as the first number, one game piece has the numeric value "10" as the first number, and the final piece has a blank on the top half and a blank on the bottom half.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with game playing surfaces, score keeping, and shuffling of game pieces have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
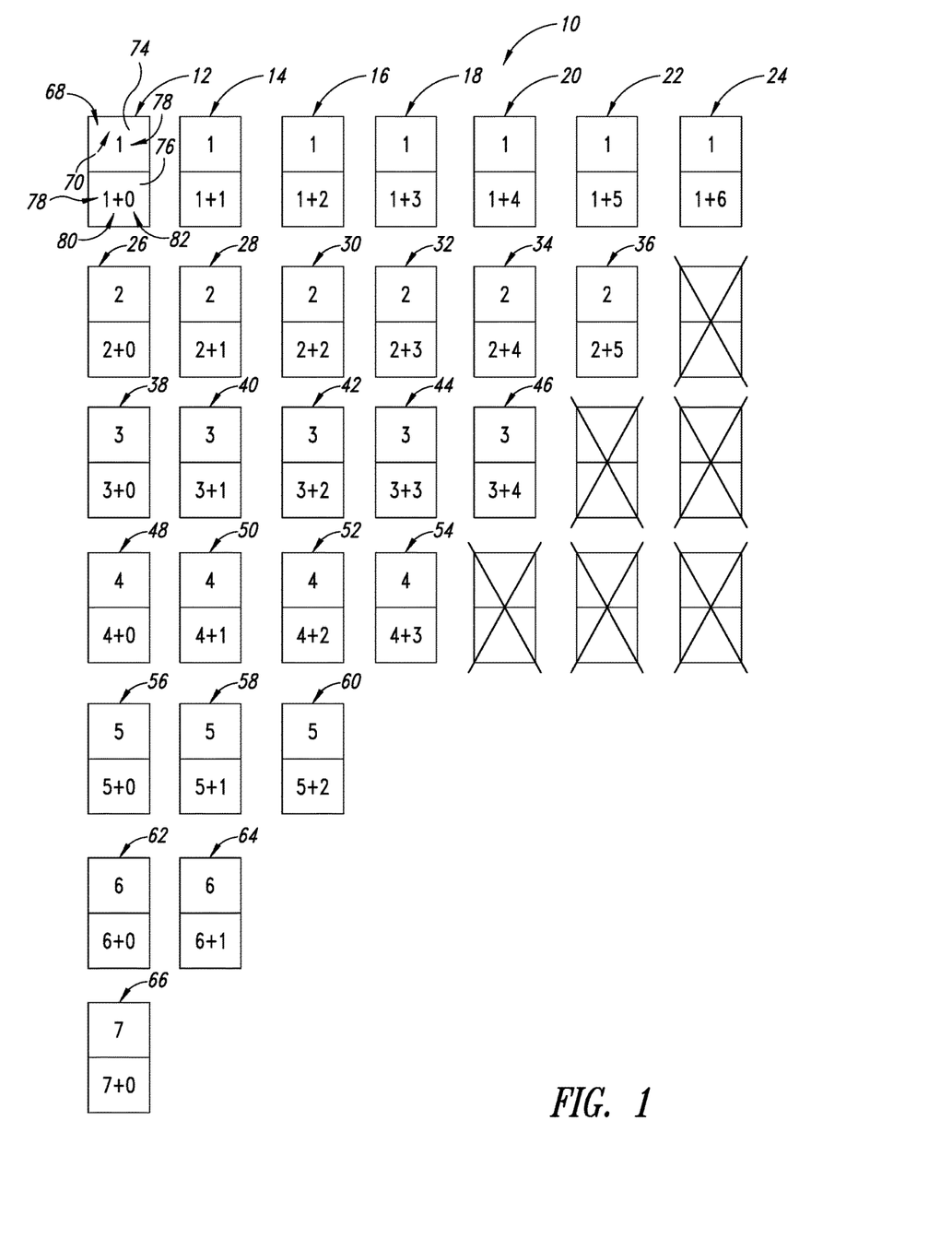
FIG. 1 is a plan view of 28 game pieces used to play an addition version of the learning game in accordance with the present disclosure.

Referring initially to FIG. 1, shown therein is a plan view of game pieces 10 used in playing the learning game of the present disclosure. There are 28 unique game pieces 12, 14, 16, 18, 20, 22, 24, 26, 28, 30, 32, 34, 36, 38, 40, 42, 44, 46, 48, 50, 52, 54, 56, 58, 60, 62, 64, and 66. Each game piece 10 preferably has a rectangular shape with a first side 68 and an opposing second side 70. The first side 68 being a playing face 72 that is divided into a first section 74 and a second section 76.

As shown in FIG. 1, the first and second sections 74, 76 are of equal size and shape, in this case a perfect square. It is to be understood that the shape of the game pieces 10 may be other than a rectangle, including other geometric shapes, preferably a polygon in which straight sides may be placed adjacent each other to indicate which numbers are being matched. Other designs may be used that employ interlocking of pieces along matching sides. Hence, the method and design of this aspect of the game pieces is open to a variety of shapes.

The first section 74 displays a first number 78, preferably an Arabic numeral although other indicia may be used to communicate a numeric value, such as Roman numerals, dots, and the like. The second section 76 also displays the first number 78 along with a mathematical operation symbol 80 and a second number 82. The second number 82 can be of the same value as the first number 78 or any different value. As with the first number 78, the second number 82 can be displayed with any form of indicia that indicates a numeric value, although Arabic numerals are preferred. The mathematical operation symbol 80, such as addition (+), subtraction (−), multiplication (×), and division (−), appears between the first and second numbers 78, 82 so as to indicate the mathematical operation that is to be performed with the two numbers.

In FIG. 1 the 28 game pieces of the 28-piece game 10 are organized into rows and columns. The first row displays all the pieces 10 in which the first number 78 is a "1." As can be seen, there are 7 total pieces having the first number as a "1."

In order for the game to be playable, the outcome of the mathematical operation is equal to or less than a total number of game pieces having a numeric value of "1" in the first section. In other words, the mathematical operation 80 displayed in the second section 76 must have a result that is not greater than the number of game pieces in the first row, i.e., the game pieces 10 have the first number 78 of numeric value "1." Thus, the addition operation in the second section 76 across the illustrated row yields the sums of 1, 2, 3, 4, 5, 6, and 7 respectively. Similarly, in the second illustrated row in FIG. 1 in which the first number 78 is a numeric value of "2," the sum of the addition operations in the second section 76 is 2, 3, 4, 5, 6, 7, respectively. The foregoing is true for all of the illustrated rows, up to the last row having a single game piece 66 in which the sum of "7+0" is "7."

It will be further observed that in certain game pieces 12, 26, 38, 48, 56, 62, and 66, the first number 78 equals the sum of the addition of the first and second numbers 78, 82. Each game piece that has the first number 78 in the first section 74 equal to the result of the mathematical operation in the second section 76 is denominated as a "double" piece. In this case, the first section 74 (or alternatively referred to as the first end 74) has the same numeric value as the second section 76 (also referred to as the second end 76). In the 28-piece game, seven game pieces have the numeric value "1" as the first number 78, six game pieces have the numeric value "2" as the first number 78, five game pieces have the numeric value "3" as the first number 78, four game pieces have the numeric value "4" as the first number 78, three game pieces have the numeric value "5" as the first number 78, two game pieces have the numeric value "6" as the first number 78, and one game piece has the numeric value "7" as the first number 78.

More particularly, it will be further noted that the lowest numeric value (in this case the numeral "1" appears in the first section 74 on only seven game pieces 10, in this case game pieces 12, 14, 16, 18, 20, 22, and 24. While the lowest numerical value numeral in this case was selected as the numeral "1," it is to be understood that any numeric value can be selected, such as zero (0), two (2), etc. The series of game pieces 12, 14, 16, 18, 20, 22, and 24 for the numerical value 1 in the first section 74 totals seven game pieces 10 in order to limit the total number of game pieces for the entire game to 28 game pieces.

In any case, the next highest numeric value numeral will appear in the first section 74 on a series of only six game pieces, as is the case with game pieces 26, 28, 30, 32, 34, and 36 having numeral "2" in the first section 74. Similarly, the third highest numerical value number appears in the first section 74 on a series of only five game pieces, in this case the numeral "3" appearing on five game pieces 38, 40, 42, 44, and 46. As can be seen, the fourth highest numerical value number is "4" and appears on a series of four game pieces 48, 50, 52, and 54, while the fifth highest numerical value number "5" appears on a series of three game pieces 56, 58, and 60, the sixth highest numerical value number "6" appears on a series of two game pieces 62, 64 and the seventh and last highest numerical value number "7" appears on one game piece 66.

In the second section 76 the first number 78 appears with the addition symbol 80 (+) followed by a second number 82. The second number 82 in a series of game pieces will always start out with the numerical value zero in order to create the "double" game piece, i.e., where the numerical value in the first section 74 equals the numerical value in the second section 76. Each subsequent game piece in the series of the numerical value for the first section 74 will have a numerical value that increases by the numerical value of 1.

Ideally, the first number and the second number are whole numbers or zero and are displayed as Arabic numerals. It is to be understood that the numbers may be displayed in other languages or numeric format, such as dots. The numbers may also be displayed with various systems of measurement, such as lengths, areas, and volumes in the English or Metric system (inches, feet, yards or centimeters and kilometers), liquid measurements and volumes, weights, and the like. These can be used to teach systems of measurement in addition to mathematical operations.

Figure 2:
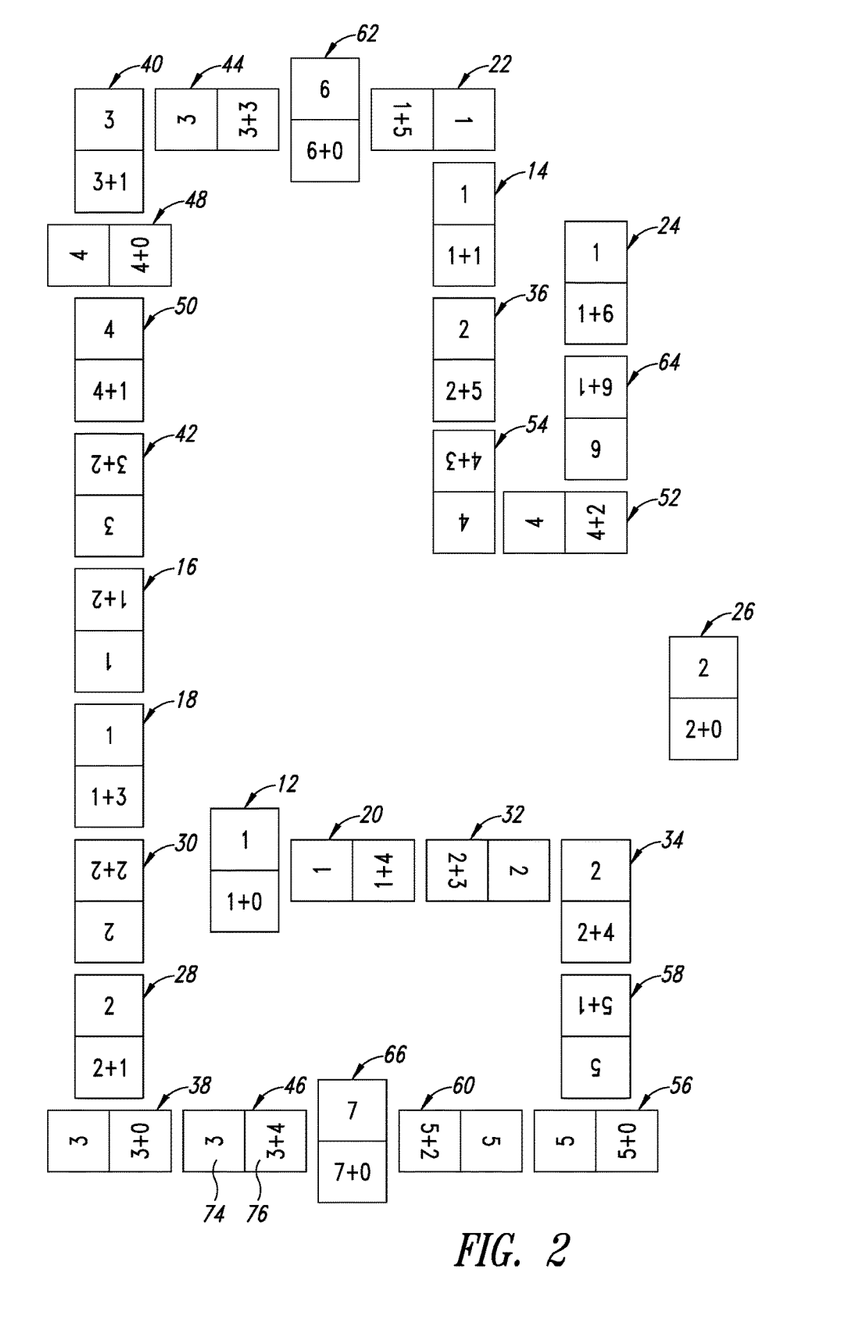
FIG. 2 is a plan view of the 28 game pieces of FIG. 1 placed on a supporting surface in accordance with the addition method of game play of the present disclosure.

Having described the game pieces, reference is now made to FIG. 2 in connection with the method of game play. In accordance with the present disclosure, a method of playing a learning game is provided that includes the domino-style game pieces 10 and the rules of play as part of a game system 100 shown in FIG. 2. A supporting surface 102 (or alternatively referred to as a playing surface 102) can be provided with the game system 100 or an existing surface, such as a table top, can be used. And a container (not shown) can be provided to store the game pieces 10, along with the rules of play described herein, the optional supporting surface 10, and an optional score card and writing utensil, such as a pencil (also not shown).

In accordance with one aspect of the present disclosure, the rules of play include the following basic steps for playing with the afore-described 28 game pieces 10:
  first, shuffling the plurality of game pieces 10 on a playing surface 102 with the playing face 72 facing the playing surface 102 to form a stock pile or draw pile of game pieces 10;
  second, each player drawing a same number of game pieces 10 from the draw pile of game pieces 10 to form a hand of game pieces;
  next, selecting a first player having a highest value double piece in their hand of game pieces to place the highest value double piece on the playing surface; and
  subsequent players taking a respective turn by either (i) placing a game piece 10 from the respective subsequent player's hand of game pieces on to the playing surface adjacent a playing piece already on the playing surface in which a numeric value of the first number in the first section of the playing piece or the numeric value of the result of the mathematical operation in the second section is equal to a numeric value of a first or second section of the playing piece already on the playing surface that is not adjacent another playing piece on the playing surface, or (ii) if no game piece in the subsequent player's hand can be played according to (i), the subsequent player drawing game pieces from the pile of game pieces until the subsequent player draws a game piece that can be played on the playing surface in accordance with step (i).

Game play continues until all the pieces have been played or until no further pieces can be played. The player who plays the last piece in their hand or to block others from playing is the winner. When the game is blocked, the player with the lowest value will win the game, and when they have the same values, the one with the less game pieces will win. The value of the piece left in the hands of the loosing team or player is added in favor of the winner. In the case there are players with the same values and the same game pieces, the winner will be the blocker player, i.e. the player who blocks the other players.

FIG. 2 illustrates a representative completed game in which all of the pieces have been played with one leftover piece 26. In this game, the first piece played was the double 7 piece 66, which has the highest value in the game. After the first piece 66 was played, the second player played piece 46, which has the number 3 in the first section 74 and the sum of 7 in the second section, represented by the math operation of adding 3 and 4. The second section 76 is placed against the first piece 66 at the dividing line between the first and second sections, and it is oriented 90 degrees with respect to the first played piece 66 to form a "T" intersection. Similarly the second piece 60 played by a third player has a 5 in the first section and the math operation of 5 plus 2, which equals 7. This piece 60 is placed in an abutting relationship on the opposite side than the second piece 46 and in a similar "T" orientation.

Play continues from player to player with additional pieces being played so that the end of a first numeric value abuts the end of another piece with the same first numeric value. The numeric value can be either a numeral by itself in the first section 74 or the sum of the math operation, in this case addition, in the second section 76.

It is to be understood that there are many permutations of the game play other than that shown in FIG. 2. It is to be further understood that the mathematical operation could be subtraction, multiplication, addition, or others known to those of skill in the art. In addition, the 28-piece addition game 10 is designed for play by two, three, or four players.

In FIG. 1 it can be seen that the top half of each game piece is a first number that is a natural number and the bottom half displays the first number and a second number that is a whole number. However, the first number can also be represented as a mathematical operation representing the natural number. In the addition version the mathematical operation would preferably be an addition operation as would be the bottom half of the same piece. It is possible that the top could be a different mathematical operation to represent the natural number, such as subtraction, multiplication, or division. The bottom half is preferably always a mathematical operation. The top number can also be a whole number or an integer as can the second number.

Figure 3:
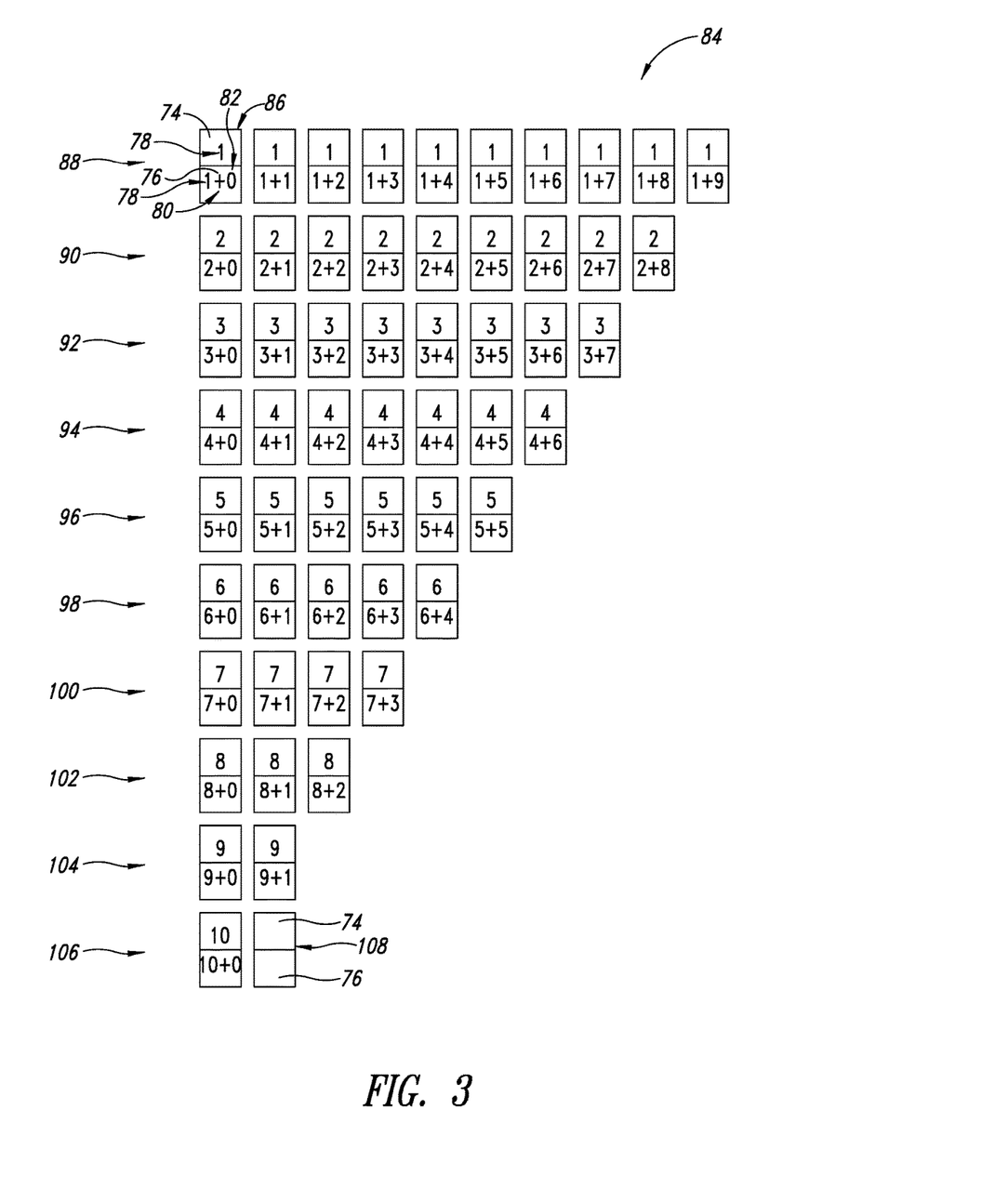
FIG. 3 is a plan view of 56 game pieces used to play an addition version of the learning game in accordance with the present disclosure.
Figure 4:
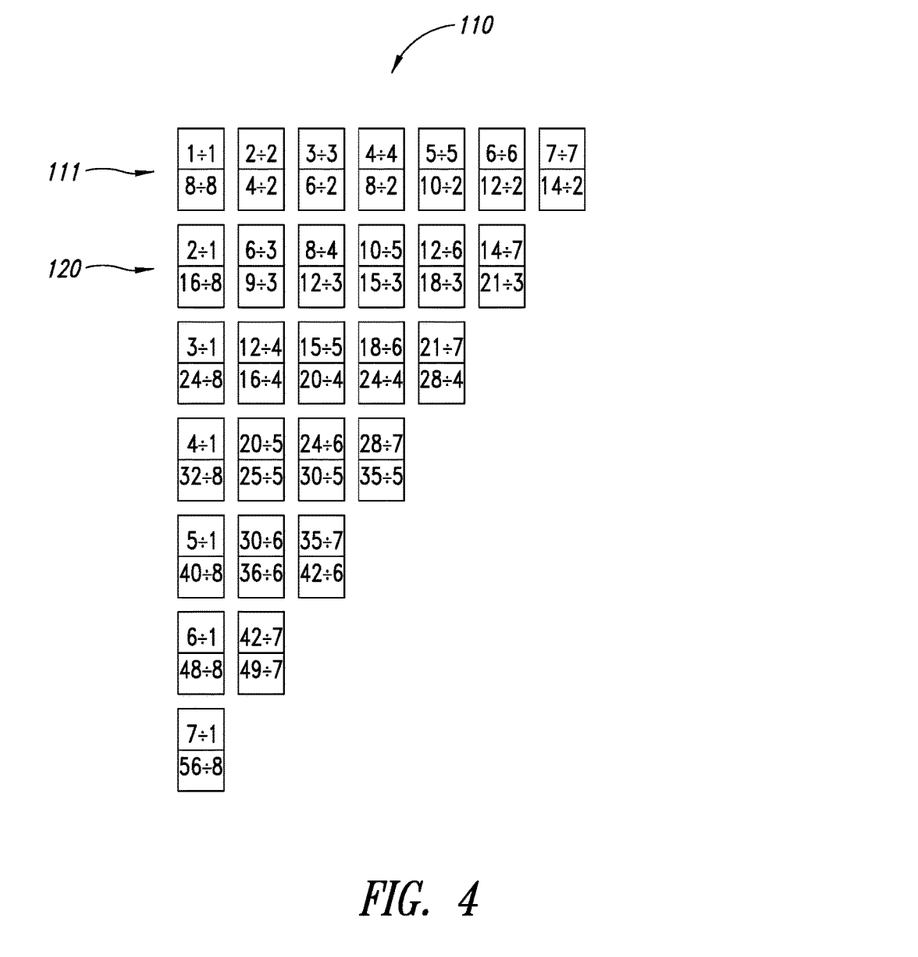
FIG. 4 is a plan view of 28 game pieces used to play a division version of the learning game in accordance with the present disclosure.

FIG. 3 illustrates a 56-piece game 84 with 56 game pieces 86 used to play an addition version of the game in accordance with the present disclosure. This version of the game is playable by 2 to 8 players as described more fully below. Each game piece 86 in the 56-piece game 84 has the same construction, format, and number display as described above with respect to the 28-piece game. For ease of reference, common elements between these two versions of the game will share the same reference.

In the 56-piece game 84, there are ten game pieces shown in the first row 88 that have "1" as the first number 78, nine game pieces in the second row 90 have "2" as the first number, eight game pieces in the third row 92 have "3" as the first number, seven game pieces in the fourth row 94 have "4" as the first number, six game pieces in the fifth row 96 have "5" as the first number, five game pieces in the sixth row 98 have "6" as the first number, four game pieces in the seventh row 100 have "7" as the first number, three game pieces in the eighth row 102 have "8" as the first number, two game pieces in the ninth row 104 have "9" as the first number, one game piece in the tenth row 106 has "10" as the first number. The final piece in the tenth row is a double blank 108 that has a blank on the top half 74 and a blank on the bottom half 76.

The 56-piece game 84 will have the extra piece 108 with the blank on the top and bottom halves as a "joker" or wild card piece that can be assigned any value by the player holding the piece. In one version of the game, the double blank piece 108 is played last.

Up to 8 players can engage in play with the 56-piece game 84, with each player taking 7 pieces and leaving none for a stock pile. When less than 8 players are playing the game, the pieces not drawn are left in a stock pile or draw pile to be drawn by the players during game play in accordance with the rules, such as when a player is unable to play a piece from their hand.

In the 56-piece version 84 of the game, the total number of pieces 86 having a "1" as the first number is 10. This means that the addition operation in the second section 76 of any of the 55 game pieces (the double blank piece 108 is excluded) must not total more than 10. The 56th piece 108 is the double blank piece and will naturally be limited to the value of the game pieces with which it is played, such as when played as the last play of a game.

FIGS. 4-8 illustrate a 28-piece division game 110, a 28-piece multiplication game 112, a 56-piece multiplication game 114, a 28-piece subtraction game 116, and a 56-piece subtraction game 118, respectively. The rules of play are the same as the addition version of the game. In addition, a double blank piece can be used in each of the 56-piece games 114, 118 as described above with respect to the 56-piece addition game 84.

Figure 5:
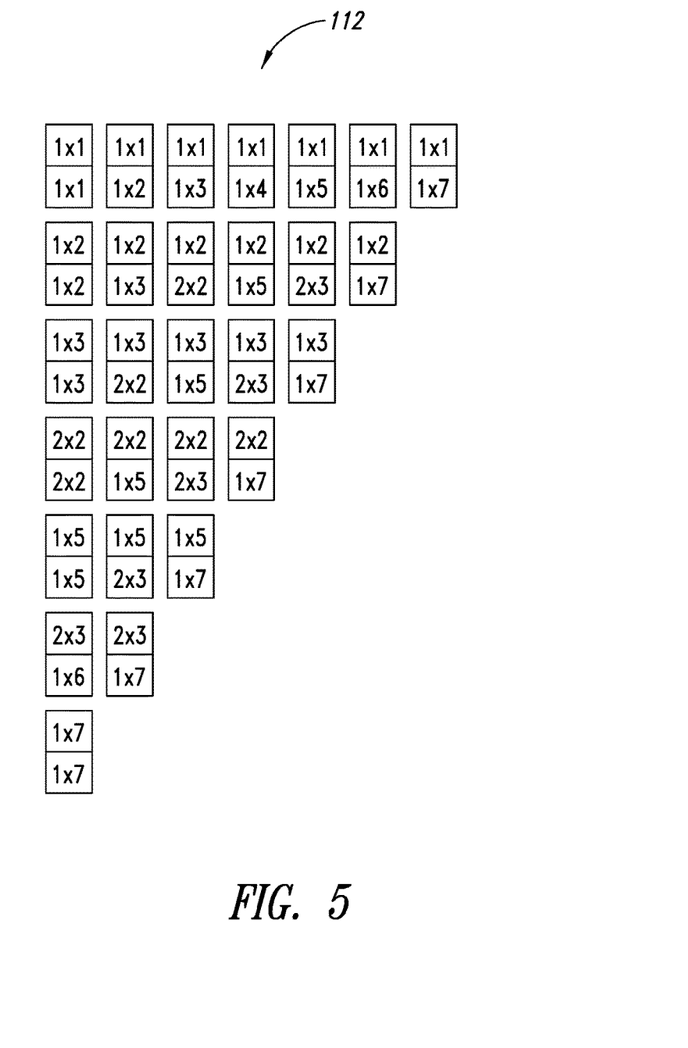
FIG. 5 is a plan view of 28 game pieces used to play a multiplication version of the learning game in accordance with the present disclosure.
Figure 6:
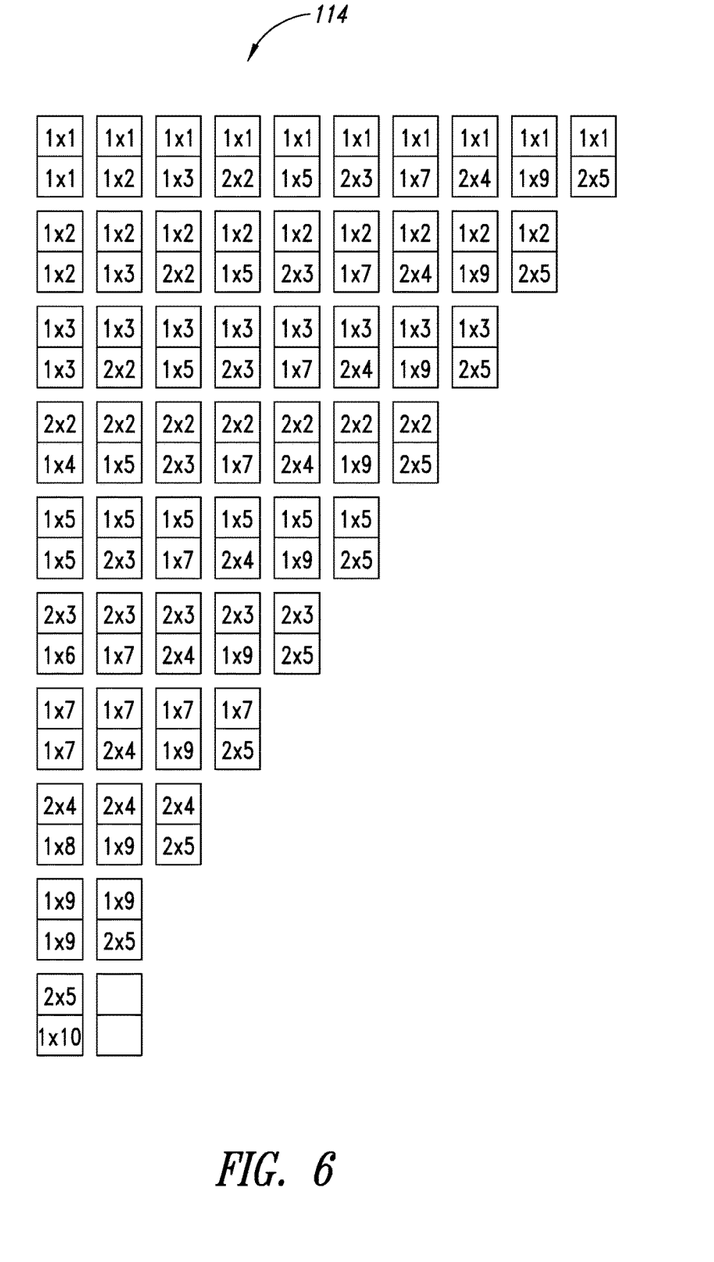
FIG. 6 is a plan view of 56 game pieces used to play a multiplication version of the learning game in accordance with the present disclosure.
Figure 7:
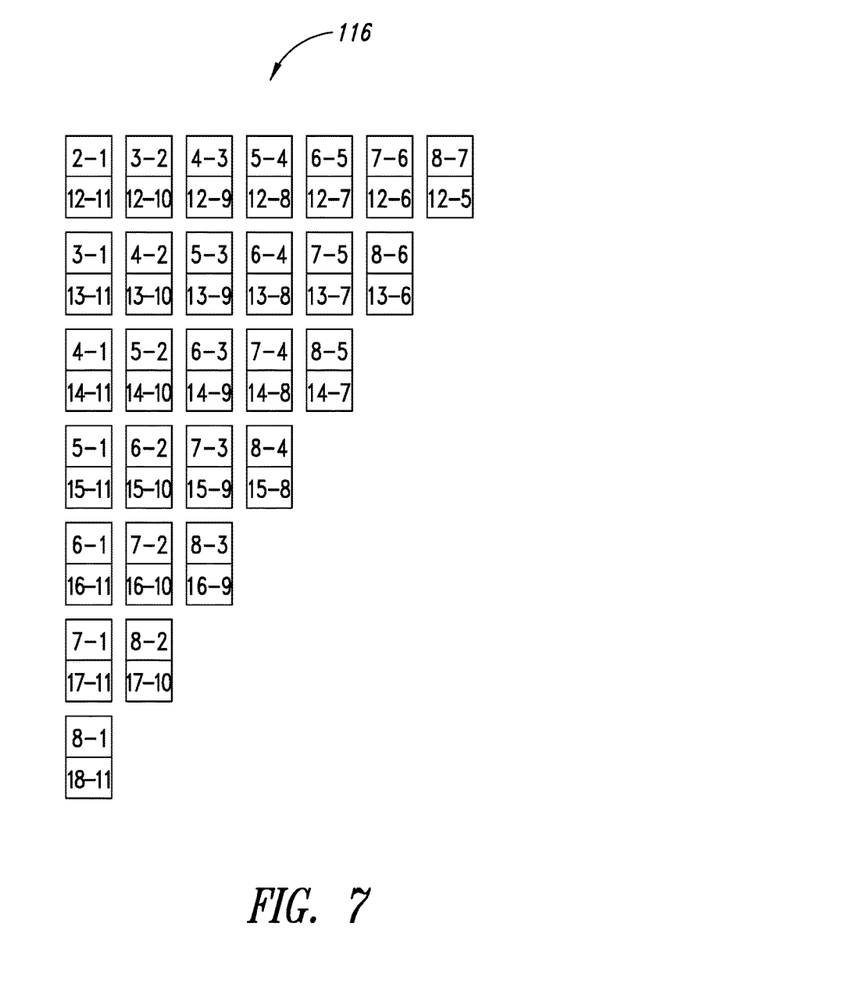
FIG. 7 is a plan view of 28 game pieces used to play a subtraction version of the learning game in accordance with the present disclosure.
Figure 8:
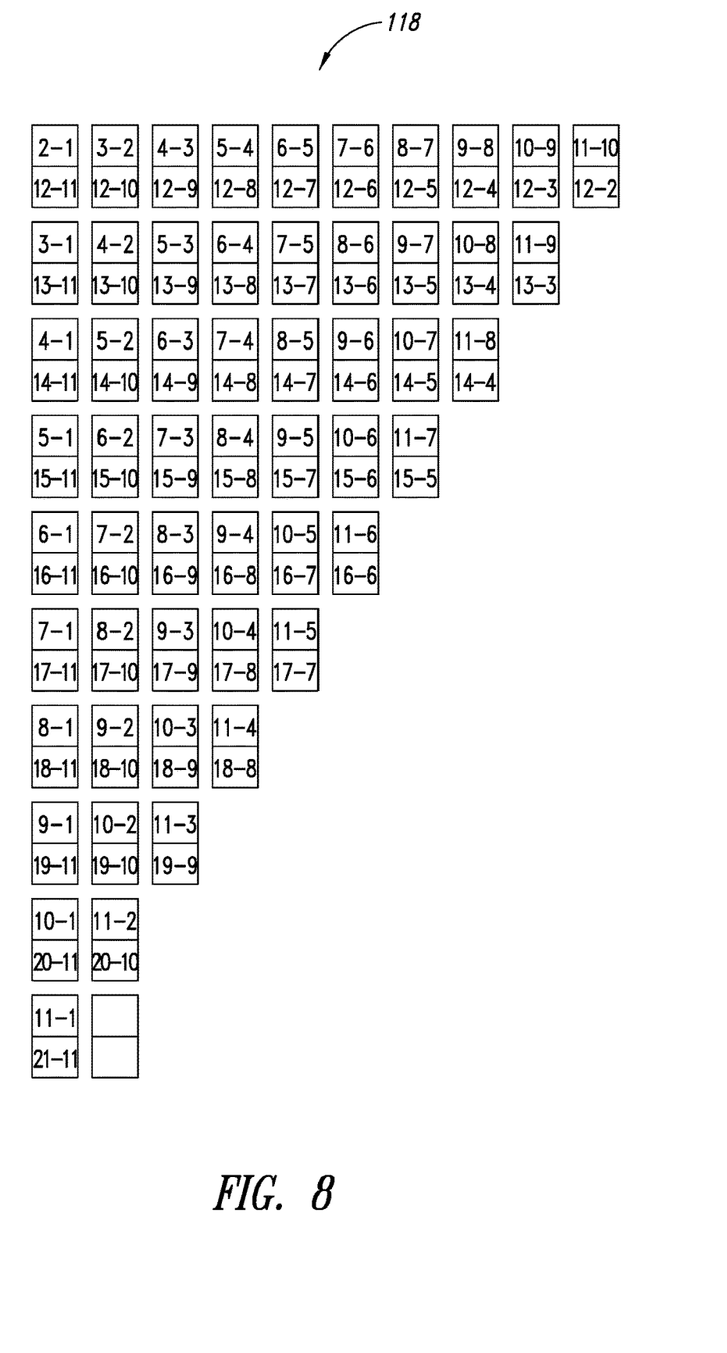
FIG. 8 is a plan view of 56 game pieces used to play a subtraction version of the learning game in accordance with the present disclosure.

As described above, the mathematical operation in the second section 76 must not have a total that is greater than the number of game pieces in the first row of displayed pieces for each version of the game. This holds true for the multiplication, division, and subtraction operation games 110, 112, 114, 116, and 118 displayed in FIGS. 4-8. In the first section 74, a whole number can be used or a mathematical operation equal to the value of the whole number may be used. For example, instead of using a "1" as the first number, the multiplication operation can be used of "1×1" as shown in FIGS. 5 and 6. Similarly, for the number "2" the multiplication operation "1×2" can be used as shown in FIGS. 5 and 6. And similarly for division, the first number "1" can be displayed as "1÷1" on the first piece, "2÷2" on the second piece, "3÷3" on the third piece, and so forth as shown in the first row 111 of FIG. 4. The number "2" can be displayed as "2÷1" on the first piece, "6÷3" on the second piece, "8÷4" on the third piece, and so forth as shown in the second row of pieces in FIG. 4. For subtraction "1" can be displayed as "2-1" on the first piece, "3-2" on the second piece, "4-3" on the third piece, and so forth as shown in the respective rows of FIGS. 7 and 8.

Each mathematical operation is a stand-alone game by itself. It is possible to combine the pieces, but only the 28-piece game can be combined with another 28-piece game because it needs to have the same values from 1 to 7. The 56-piece game can be combined with another 56-piece game because it will have the same values from 1 to 10. The 28-piece game cannot be combined with the 56-piece game. The pieces with the same values but different mathematical operations can be combined or mixed up. The games with the same values and with different mathematical operations can be combined to create a 112-piece set, a 168-piece set, and a 224-piece set, and so on.

It will be appreciated that the present game system and method can be implemented in electronic form, such as an app, downloadable game, or game played on the cloud as is well known today. This implementation is described in the general context of a computer network, as is well known in the industry, and computer executable instructions that are executed by one or more commodity hardware such as general purpose computing devices associated with the computer network.

In one implementation, the computing devices are configured as remote computers, and one or more servers. Application software is provided on the servers, which are configured to have at least one and preferably a plurality of databases structured to store the retrieved and received image data of the game pieces and related information such as the rules of play as described above. The application software may reside on the server. Further, it is preferable that users access the application software through an internet browser that functions as an interface between the application software and the operating system for the remote computers. The server could employ any one of the currently existing operating systems. In addition, it should be appreciated by those with skill in the art that other applications besides the browser may also be utilized to act as an interface between the application software and the remote computers.

A graphical user interface can be utilized that includes various menu bars, drop-down menus, buttons, and display windows. A detailed description of the graphical user interface, the menu bars, drop-down menus, exemplary buttons and display windows, and the functionality associated with those menus, buttons and windows, is not described in detail herein inasmuch as providing such is well within the level of ordinary skill in this technology.

As will be readily understood, the commodity hardware need not be limited to personal computers, but may include without limitation mainframe computers, personal digital assistants, cellular telephones, hand-held devices, multiprocessor systems, microprocessor-based or programmable consumer electronics, minicomputers or the like and configured for their desired use within the system. For performing the procedures described hereinafter, the computer executable instructions may be written as routines, programs, objects, components, and/or data structures that perform particular tasks. Within the network, the application software such as computer executable instructions may reside on a single remote computer or server, or the tasks performed by the application software may be distributed among a plurality of the computers. While described in the context of a computer network, it should also be understood certain aspects of the disclosed game system and method may be implemented in a stand-alone, general purpose computing device that may not necessarily be connected to a computer network.

To efficiently provide users with access to the application software, the server computers and the underlying framework for the computer network may be provided by a service company itself or by outsourcing the hosting of the application software to an application service provider ("ASP"). ASPs are companies that provide server computers that store and run a software application for a third party entity, which is accessible to the third party entity's users via the Internet or similar means. Therefore, the server computer for operating the software application may be hosted on a computer that is owned and maintained by another party and users may then access and use application software applications via the host computer without storing the software application on the remote computers. A well-known model is the Application Service Provider (ASP), which provides server computers that store the data and the application software that is accessible by the user via the Internet or other network environment. For example, school districts may access the electronic version of the game system and learning method described herein by utilizing an ASP.

To perform the method, processes, procedures, and tasks disclosed herein via the application software, the computers may include, as needed, a display device, such as a video adapter, a video display device, a processing unit, a system memory, and related system bus that is configured to couple the system memory to the processing unit. The video adapter is configured to enable the computers to support the video display device, which may take the form of a cathode ray tube ("CRT"), a liquid crystal display ("LCD"), a flat screen monitor, a touch screen monitor or similar device to display textual and graphical data to the user. The display device enables a user to view information, such as code, file directories, error logs, execution logs and graphical user interface tools.

The computers may be further configured to include a hard disk drive for reading from and writing to a hard disk, a read only memory (ROM), a magnetic disk drive for reading from and writing to a magnetic disk, or an optical disk drive for reading from and writing to a removable optical disk or any other suitable data storage device. The hard disk drive, magnetic disk drive, and optical disk drive may be connected to the system bus by a hard disk drive interface, a magnetic disk drive interface, or an optical disk drive interface, respectively, or other suitable data interface. The drives and their associated computer-readable media provide a means of non-volatile storage for the computer executable instructions and any other data structures, program modules, databases, arrays, etc., utilized during the operation of the computers.

To connect the computers within the network, a network interface or adapter is utilized. In a wide area network environment, such as the Internet, a network interface, such as a router, modem, either hardwired or wireless, or a similar device is employed. The network connections are provided as exemplary implementations and other means of establishing a communications link among the computers can be employed. The network interface may also utilize TCP/IP, FTP, SFTP, Telnet SSH, HTTP, SHTTP, HTTPS, RSH, REXEC, etc., and other network connectivity protocols.

In one representative implementation, the application software and databases reside on the server and are managed either by the provider of the application software or by a third-party or both. Those with skill in the art will understand, however, that the application software and databases may reside on the remote computer or different computers and may be managed and maintained by the user. The graphical user interface is configured to utilize HTTP or HTTPS or any other suitable format to load and display web pages and other information.

In order to accommodate exponentially increasing amount of image-related content, additional computational resources available via cloud computing may be included in the system. As commonly understood, "cloud computing" means the use of remotely located database and processing resources available over a public network, such as the Internet. Such resources can include a virtual or physical computer coupled to a worldwide network of computers, such as the Internet, or other public network. In order to provide such computational resources via a cloud network on a secure basis, commercially available security encryption protocols such as SSL and PGP may be included in the system.

In accordance with one aspect of the present disclosure, the application software and databases may reside on a computer that is connected to a computer network, such as a cloud computing network or the application software and databases may reside on a computer that forms part of the cloud computing network. The cloud computing network may also be used to process electronically stored data that could involve several million pages of documents and encompass multiple terabytes of information. The ability to use low-cost alternatives to traditional computing needs, therefore, may have a significant impact on reducing the cost and resources necessary to receive and retrieve image data, process the data, and extract useful information therefrom.

It will be appreciated that various types of distributed processing may be relied upon in the disclosed system. Because of the computational resources required to perform the describe method and process, multiple commodity hardware are coupled together via the Internet or other form of network connection. The use of a cloud computing network alleviates the severe demand for computational resources and decreases the overhead cost associated with processing the image data as described herein. For example, the architecture of the cloud computing network can encompass use of a private network, a web host, or a combination thereof. As will be readily understood, a cloud computing architecture provides an expandable storage resource as well as a plurality of virtual computers to process the electronically stored image and brand data.

The various embodiments described above can be combined to provide further embodiments. Aspects of the embodiments can be modified, if necessary to employ concepts of the various patents, applications and publications to provide yet further embodiments. For example, the game pieces can be playing cards in physical form or in electronic form.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of playing a learning game having a plurality of game pieces, each game piece having first and second opposing sides with a playing face on the first side divided into a first section and a second section, the first section displaying a first number and the second section displaying the first number, a mathematical operation, and a second number, and each game piece that has the first number in the first section equal to a result of the mathematical operation in the second section is denominated as a "double" piece, and each game piece that has a first section that is blank and a second section that is blank is denominated a "wild card" piece, the method comprising:

shuffling the plurality of game pieces on a playing surface with the playing face facing the playing surface to form a draw pile of game pieces;

each player drawing a same number of pieces from the draw pile of game pieces to form a hand of game pieces;

determining a first player by determining which player has a highest numeric value double piece in their hand of game pieces;

playing a first game piece on the playing surface; and taking turns by subsequent players by either:

(i) placing a game piece from the respective subsequent player's hand of pieces on to the playing surface adjacent a game piece already on the playing surface in which a numeric value of the result of the mathematical operation in the second section of the game piece from the respective subsequent player's hand of game pieces is equal to a numeric value of a first number or a mathematical operation of the first number and a second number on a respective first or second section of the game piece already on the playing surface and in which the respective first and second section is not adjacent another game piece on the playing surface; or         (ii) if no game piece in the subsequent player's hand can be played, the subsequent player drawing game pieces from the draw pile of game pieces until the subsequent player draws a game piece that can be played on the playing surface in accordance with step (i).

2. The method of claim 1 wherein playing a first game piece comprises playing the highest numeric value double game piece on the playing surface.

3. The method of claim 1, further comprising subsequent players taking turns until either all game pieces have been played or no game pieces can be played.

4. The game of claim 3 wherein the subsequent players taking turns comprises at least one player playing the wild card piece and assigning a value to the first and second sections of the at least one player's choosing.

* * * * *